No. 856,967. PATENTED JUNE 11, 1907.
S. T. LEWIS.
VARIABLE SPEED GEAR.
APPLICATION FILED MAY 28, 1906.
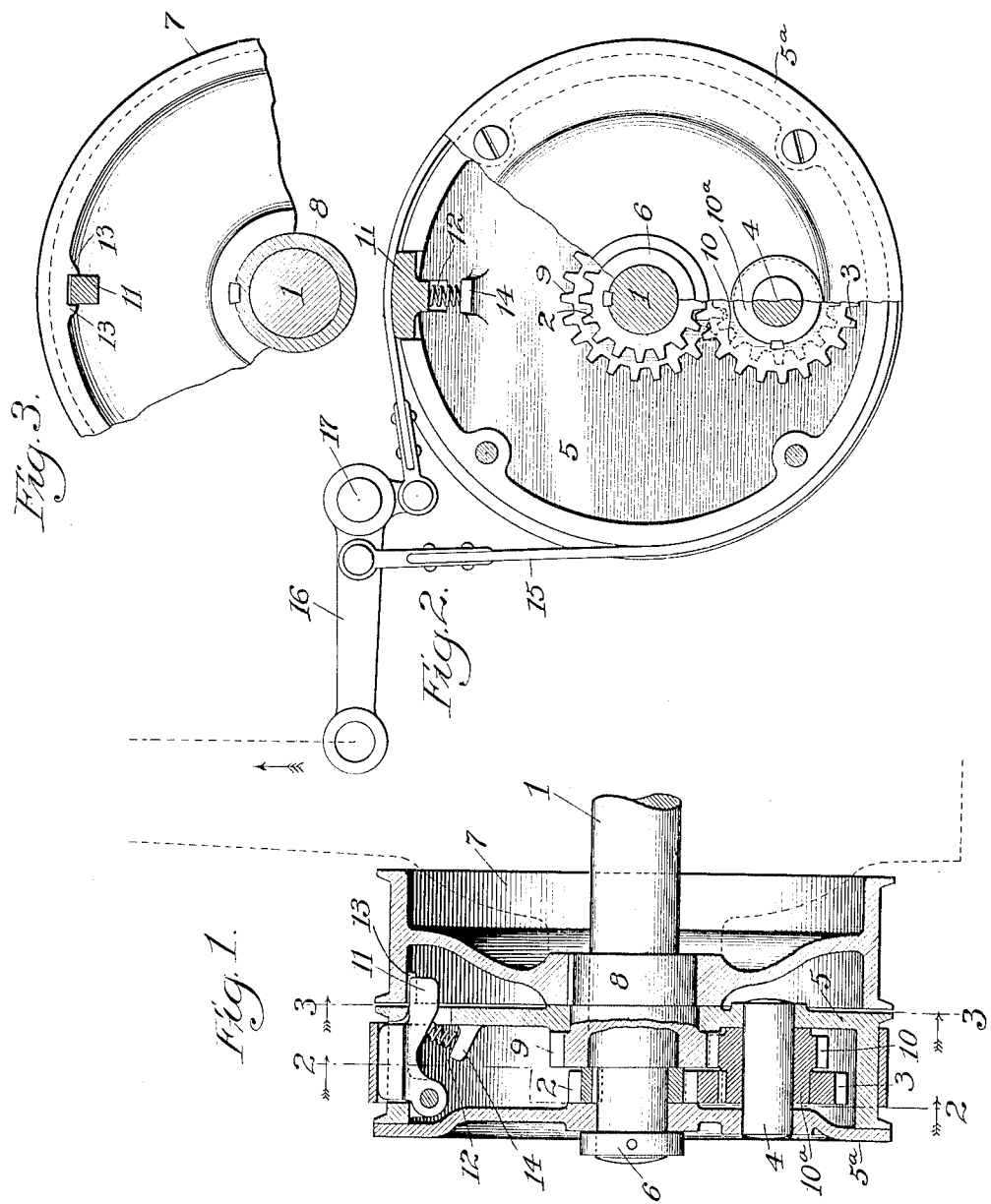

UNITED STATES PATENT OFFICE.

SHERMAN T. LEWIS, OF MILWAUKEE, WISCONSIN, ASSIGNOR OF TWO-THIRDS TO RETTA PIERCE DAVENPORT AND EVERETT C. ROCKWELL, BOTH OF CHICAGO, ILLINOIS.

VARIABLE-SPEED GEAR.

No. 856,967.      Specification of Letters Patent.      Patented June 11, 1907.

Application filed May 28, 1906. Serial No. 319,101.

*To all whom it may concern:*

Be it known that I, SHERMAN T. LEWIS, a citizen of the United States, residing at Milwaukee, in the county of Milwaukee and State of Wisconsin, have invented a certain new and useful Improvement in Variable-Speed Gear, of which the following is a specification.

My invention relates to variable speed gears, and the object of the invention is to provide a gearing whereby different speeds of the driven member may be obtained from any given speed of the driving member.

My invention in the form here illustrated is adapted to give only two different speeds, one of them equal to and the other less than the speed of the driving member, and the mechanism as designed is specially applicable to bicycles and motor cycles.

I accomplish my object by the mechanism illustrated in the accompanying drawings, in which:

Figure 1 is a view chiefly in section through the axis of the driving and driven members. Fig. 2 is a general side view of the mechanism, a part of the outer covering being broken away to illustrate the relation of the interior parts. Fig. 3 is a fragmentary sectional view taken on line 3—3, Fig. 1.

Similar numerals refer to similar parts throughout the several views.

Shaft 1 is a driving member and in the case of bicycles or motor cycles may be driven from the pedals or motor as the case may be. Upon said shaft by key or otherwise is rigidly secured a gear-wheel 2 which is adapted to mesh with the gear-wheel 3 freely rotatable on pin 4. Pin 4 is mounted in a brake-pulley which in the present design is composed of two parts, 5 and 5ª. The pulley part 5ª has a bearing on shaft 1 but is loose thereon so as to rotate independently thereof and is laterally confined by means of a retaining collar 6, pinned or otherwise secured to said shaft. The driven member of the present mechanism is the part 7 which in the present design is in the form of a pulley adapted to furnish power to the motor cycle or whatever machine is to be driven. Said pulley is keyed or otherwise rigidly secured to the sleeve 8 which is loosely mounted upon shaft 1 so as to be freely rotatable independently thereof.

Rigid with sleeve 8 and preferably formed integral therewith as shown in Fig. 1 is a gear wheel 9 which is adapted to mesh with the gear wheel 10 on pin 4. Wheels 3 and 10 rotate in unison, and although they might consist of a single piece under certain conditions, they are for structural reasons here shown to be formed of two pieces, wheel 10 having a boss or sleeve portion 10ª extending toward the left which portion is freely rotatable upon pin 4 but is keyed or otherwise rigidly secured to the above mentioned gear-wheel 3.

Pivotally attached to pulley part 5 is a clutch arm 11 which is acted upon by spring 12 in such manner as to tend normally to move into and remain in engagement between the lugs 13—13 formed upon the inner edge of the rim of pulley 7. The inner extremity of spring 12 is supported upon the lug 14 formed within the pulley part 5. Extending around the periphery of the pulley 5 is a band 15 the ends whereof are secured to the bell crank lever 16 in such manner that force exerted upon the free end of said lever in the proper direction will tighten said band and thereby attain two results; one, to hold pulley 5, 5ª from rotation by reason of the frictional contact of said band upon said pulley and second, to force arm 11 against the resistance of its spring away from and out of engagement with the lugs 13 upon pulley 7. Lever 16 is pivotally supported upon the stationary axis 17.

The mechanism operates as follows: Let it be supposed that the brake-lever 16 is tight set so that it will prevent pulley 5, 5ª from rotating and will force arm 11 out of engagement with the lugs 13. Under these conditions pin 4 will become stationary and pulley 7 will be rotatable independently of pulley 5, 5ª. If now, the driving shaft 1 rotates at any given speed it will rotate the gear wheel 2, which will in turn drive the gear-wheels 3, 10 and 9, and pulley 7. Pin 4 being stationary it is evident that if wheels 2 and 9 were the same size and wheels 3 and 10 were the same size the speed of pulley 7 would be the same as that of shaft 1. In the design illustrated however, as gear 2 is smaller than gear 3, and as gear 10 is smaller than gear 9, pulley 7 will be rotated at a slower speed than shaft 1, the ratio depending upon the relative sizes of the gear wheels. Now let it be supposed that a different speed of the driven member 7 is desired. Brake-lever 16 is released by the operator so that pulley 5, 5ª becomes free to rotate, and spring 12 forces arm 11 into engagement with the lugs 13. The pulleys 7 and 5 now rotate as a single piece, which causes the pin 4 to travel in the same direction and at the same speed as pulley 7. Consequently instead of the speed of member 7 being the same as it was before it is now increased by reason of the supplementary effect of the movement of pin 4 and the gear-wheels thereon. Thus when the brake band 15 is tight pulley 7 will be caused to rotate at a slower speed than shaft 1 but when said band is released and wheels 5 and 7 rotate in unison the speed of pulley 7 will be increased.

In order to simplify the drawings and facilitate an understanding of the device I have shown only a single gear-bearing pin 4, and a single arm 11. Those skilled in the mechanic arts however, will readily understand that in actual practice it would be desirable to employ two or four pins 4 each with their gear-wheels 3 and 10 and two or four clutch arms 11 and connected mechanism. In fact any number of these parts may be employed whether an odd or even number, the operation in each case being the same as in the case described and shown.

It will also be understood that the form of the driving and driven members and also of the intermediate member 5, 5ª might be considerably varied without departing from the spirit of the invention. Further, although shaft 1 is herein referred to as the driving member and pulley 7 as the driven member, the functions of these parts might be reversed so that power from the motor be supplied first to member 7 for delivery to member 1.

What I claim as new, and desire to secure by Letters-Patent is:

1. In a change speed gear the combination of a driving member, a driven member, and an intermediate member, all independently rotatable about a common axis, a train of gears for transmitting motion from the driving to the driven member, said transmission gearing including a gear wheel rigid with the driving member, another gear wheel rigid with the driven member, and two rigidly connected gear wheels connecting them; a pin mounted in said intermediate member eccentric with the axis thereof for loosely supporting said connected gear wheels; a clutch arm, spring-influenced to normally cause said driven and intermediate members to rotate in unison; and a brake adapted to operate to release said clutch and simultaneously arrest said intermediate member.

2. In a change speed gear, the combination of a driving shaft, a driven member loosely mounted thereon, an intermediate member rotatable independently of said shaft and driven member; a pin on said intermediate member eccentric but parallel to said shaft; a gear wheel tight upon said shaft and another tight upon said driven member; a double gear wheel connecting them and loosely mounted on said pin; a clutch normally causing said intermediate and driven members to rotate in unison; a band brake operative upon said intermediate member to prevent its rotation and adapted to release said clutch; and means for operating said band brake.

In witness whereof, I have hereunto subscribed my name in the presence of two witnesses.

SHERMAN T. LEWIS.

Witnesses:
 RETTA PIERCE DAVENPORT,
 EVERETT C. ROCKWELL.